Sept. 3, 1963 D. G. GUMPERTZ 3,103,007
LUMINOUS DISPLAY DEVICE
Filed March 23, 1959 7 Sheets-Sheet 1

INVENTOR.
DONALD G. GUMPERTZ
BY
Christie, Parker & Hale
ATTORNEYS

Sept. 3, 1963 D. G. GUMPERTZ 3,103,007
LUMINOUS DISPLAY DEVICE
Filed March 23, 1959 7 Sheets-Sheet 3

INVENTOR.
DONALD G. GUMPERTZ
BY
Christie, Parker & Hale
ATTORNEYS

Sept. 3, 1963     D. G. GUMPERTZ     3,103,007
LUMINOUS DISPLAY DEVICE

Filed March 23, 1959     7 Sheets-Sheet 5

(A)

(B)

(C)

(A)

(B)

INVENTOR.
DONALD G. GUMPERTZ
BY
Christie, Parker & Hale
ATTORNEYS

United States Patent Office 3,103,007
Patented Sept. 3, 1963

3,103,007
LUMINOUS DISPLAY DEVICE
Donald G. Gumpertz, 3973 Lankershim Blvd.,
North Hollywood, Calif.
Filed Mar. 23, 1959, Ser. No. 801,153
8 Claims. (Cl. 340—347)

This invention relates to the visual display of indicia. More particularly, the invention refers to a device in which the image of alphanumeric characters is projected upon a display surface by an illumination system. The selection of the character is accomplished by manual or electromechanical means.

The device may be employed as a single unit, or groups of devices may be assembled for visual display of legends. For example, a group of devices may be employed to provide a visual alphanumeric readout from a binary storage.

Various types of compact visual readout devices are known in the art, in which a character is presented on the full screen. Such devices fall generally into two categories: (1) optical focusing devices, and (2) character synthesis devices. The present invention does not require the special expensive lenses required by optical focusing devices, and the appearance and recognizability of characters is superior to that of character synthesizing devices. Furthermore, the present invention does not require multiple illumination sources, as do both of the conventional devices.

In its preferred embodiment, the present invention employs a translucent screen for the display of indicia. A source of illumination is placed to the rear of the screen so as to illuminate it, and a series of indicia plates, resembling photographic negatives in appearance, are positioned between the source of illumination and the screen, so that any light reaching the screen must pass successively through each of the indicia plates. Thus, the indicia cast upon the screen will represent only those portions of the screen not obscured by any one of the indicia plates. The shifting of any one of the indicia plates in a direction perpendicular to the path of light through the plates will therefore cause a change in the shadow cast upon the screen.

According to the invention, each indicium plate has a selected pattern of transparent and opaque areas. In the preferred embodiment, each plate corresponds to an alphanumeric indicium. The plates are placed in a preselected alignment between the source of illumination and the display surface, so that the representation cast upon the display surface is formed by light passing through those transparent areas simultaneously in alignment in all of the plates. The plate corresponding to the indicium desired to be represented is then displaced from the preselected alignment. The physical extent of the displacement required is dependent upon the dimensional characteristics of the code used on the plates. In the preferred embodiment, the amount of displacement is much less than the lateral dimension of the plate. When the selected plate is displaced, a new pattern of aligned transparent areas is set up, and, the pattern on the plates having been so designed, the desired indicium is cast upon the display surface.

In the preferred embodiment, a coding plate is utilized to set the overall pattern of illumination. In this embodiment, the coding plate remains stationary, and the light passing through transparent areas formed by the shifting of indicia plates must also pass through the fixed transparent areas of the coding plate in order to reach the viewing surface. Therefore, the coding plate is utilized to prevent the formation of spurious transparent areas. A series of camming surfaces are utilized in the preferred embodiment to control the displacement of the indicia plates. The camming surfaces are mounted on drive shafts the rotation of which is controlled to give the desired cam alignment so that the proper indicium plate is displaced.

The invention may be more readily understood by referring to the drawing in which:

FIGURE 15 is a wiring diagram of the actuation and check circuits for a luminous display device according to the invention.

Figure 1:
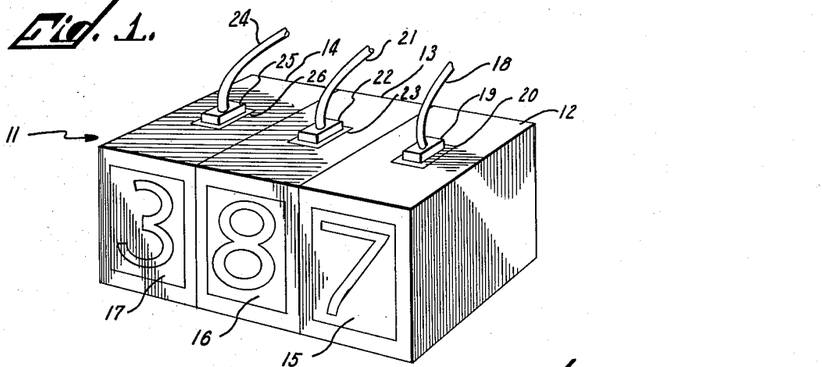
FIGURE 1 is a perspective view of three display units grouped together.

Referring now to FIG. 1, there is shown a three digit display device 11 consisting of a first display device 12, a second display device 13, and a third display device 14 grouped together. The first display device 12 has a screen 15 which displays the numeral "7." The second display device 13 has a screen 16 which displays the numeral "8," and the third display device 14 has a screen 17 which displays the numeral "3." A first control cable 18 having a terminal plug 19 is connected to the first display device 12 at a plug receptacle 20. Similarly, a second control cable 21 having a terminal plug 22 is connected to the second display device 13 at a receptacle 23 and a third control cable 24 is connected to the third display device 14 by means of a plug 25 and a receptacle 26. The control cables 18, 21, and 24 are also connected to a control center (not shown) from which the information to be displayed is transmitted to the individual display devices.

Figures 2, 3:
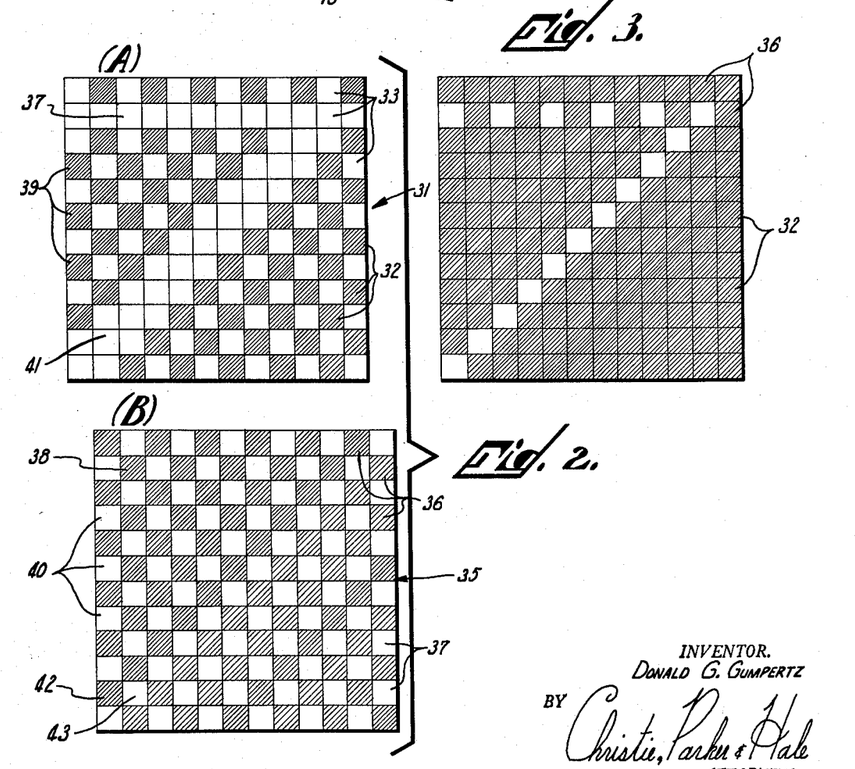
FIGURE 2 (parts (A) and (B) taken together) illustrates the transparent and opaque patterns of an indicium plate and a coding plate.
FIGURE 3 illustrates the pattern formed by the superposition of the plates of FIG. 2.

In FIG. 2, there are illustrated typical plates utilized in the display of indicia. In FIG. 2(A), there is shown a plate 31 having opaque squares 32 and transparent squares 33. The plate 31 is utilized to display the numeral "7" in conjunction with a coding plate 35 illustrated in FIG. 2(B). The coding plate 35 has opaque squares 36 and transparent squares 37 arranged in alternate fashion. If the coding plate 35 is superimposed over the "7" plate 31, while maintaining the horizontal offset of one square illustrated between (A) and (B) of FIG. 2, the resultant transparent area pattern is identical with that of the coding plate 35, since there is superimposed over each opaque square 32 of the "7" plate 31 an opaque square 36 of the coding plate 35, while some of the transparent squares 33 of the "7" plate 31 also have opaque squares 36 superimposed over them. For example, the transparent square 37 of the "7" plate 31 has an opaque square 38 superimposed over it by the coding plate 35.

If the "7" plate 31 and the coding plate 35 are now aligned horizontally, by eliminating the one square offset illustrated in FIG. 2, the superposition results in the formation by the resultant transparent area pattern of the numeral "7," as is illustrated in FIG. 3. For example, referring to FIG. 3 and assuming that the coding plate 35 is interposed between the viewer and the "7" plate 31, the opaque squares 36 will still be present, but now opaque squares 39 (FIG. 2(A)) are positioned so as to prevent the passage of light from behind the "7" plate through transparent squares 40 of the coding plate. However, a transparent square 41 of the "7" plate (FIG. 2(A)) which, prior to horizontal alignment was obscured by the opaque square 42 of the coding plate 35 (FIG. 2(B)), now has a transparent square 43 of plate 35 superimposed over it, resulting in a transparent area. The combination of such transparent areas form the desired indicium, in this case the numeral "7."

The use of large squares, as illustrated in FIGS. 2 and 3, which results in rather crudely formed indicia, is for illustrative purposes only, and it is to be understood that utilization of a greater number of smaller squares will result in more sophisticated indicia. Moreover, from a production aspect, the use of circles rather than squares for either the opaque or the transparent portions is desirable. It is apparent that the types of representation possible with the above described system are not limited to numerical, alphabetic, or alphanumeric indicia. For example, anything capable of photographic reproduction may be reproduced by the invention. Therefore, as used herein, "alphanumeric" refers to any representation which may be photographically reproduced.

It is to be noted that the above described system utilizes a separate plate for each indicium. However, the invention may also be utilized with indicia presentation systems in which the indicia are synthesized by approximation through the selective combination of lines. In such a system, plates represent the required lines, and a combination of plates is utilized to give the resultant transparent area to form the desired indicium. Furthermore, the invention is equally applicable to the formation of dark figures with a light backgorund, by transposing the transparent and opaque portions of the plates illustrated. It has been determined that, for luminous displays, the perceptibility by humans of a light figure against a dark background is greater than the perceptibility, in an equivalent system, of a dark figure against a light backgorund, and therefore only the former system is described herein.

Figures 4, 5, 6:
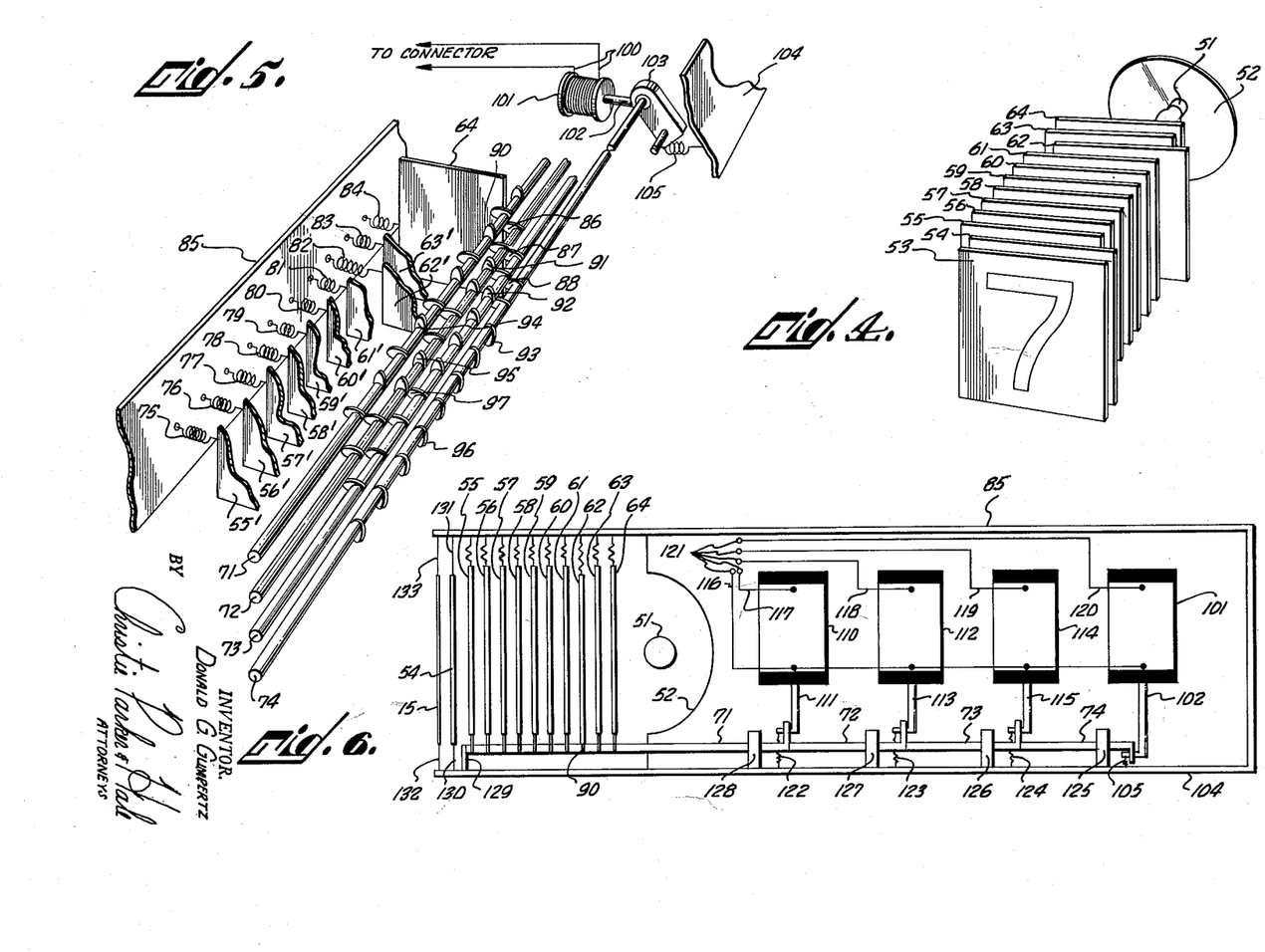
FIGURE 4 is a perspective view of indicia plates, coding plate, and screen aligned so as to display the numeral 7.
FIGURE 5 is a perspective view of the camming mechanism, and drive mechanism therefor, for the plates as shown in FIG. 4.
FIGURE 6 is a partial schematic diagram of the display device.
Figure 5:
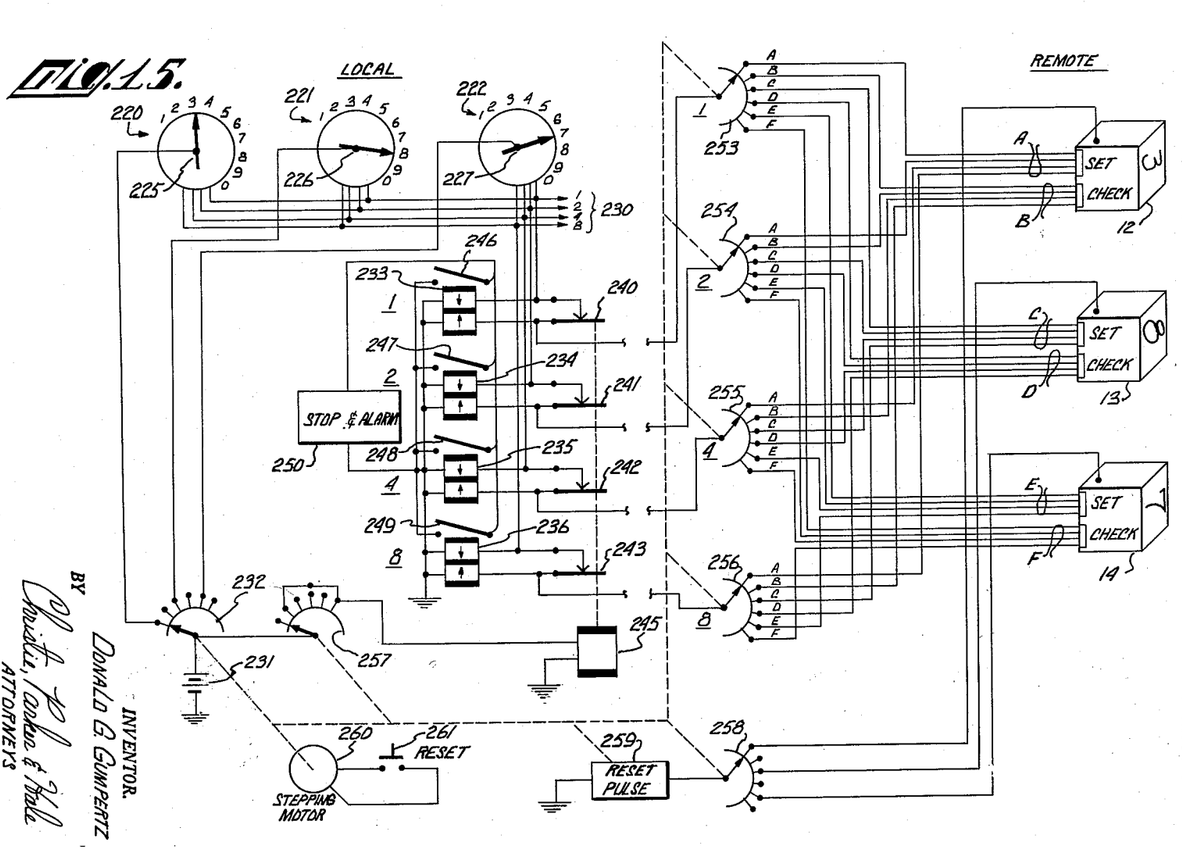

FIGURE 4 illustrates the display and indicia forming components of the first display device 12 (FIG. 1). The components of FIG. 4 are arranged to form the numeral 7. A source of illumination depicted as a light 51 and a reflector 52 projects a beam of light toward a display screen 53 through a coding plate 54, a "0" plate 55, a "1" plate 56, a "2" plate 57, a "3" plate 58, a "4" plate 59, a "5" plate 60, a "6" plate 61, a "7" plate 62, an "8" plate 63, and a "9" plate 64. It should be noted that the coding plate 54 and the "7" plate 62 are displaced in a horizontal direction from the alignment of the remaining indicia plates 55–61, 63, 64. The displacement corresponds to the displacement described hereinbefore with respect to FIGS. 2 and 3. In the embodiment of FIG. 4, all of the indicia plates 55–64 are normally in a linear alignment, and the coding plate 54 is offset from this alignment. In order to display a numeral on the screen 53, the plate corresponding to the desired numeral is displaced from the indicia plate alignment and so positioned with respect to the coding plate 54 and the remaining indicia plates that a pattern of transparent areas common to all of the indicia plates 55–64 and the coding plate 54 is formed. The light rays from the light source 51 are formed into a beam by the reflector 52 and pass through these common areas to strike the display screen 53, forming the desired numeral thereon.

FIGURE 5 depicts a mechanism for converting a binary coded information input into its decimal equivalent and driving a system such as that illustrated in FIG. 4 so as to display said decimal equivalent. A series of cam shafts 71, 72, 73 and 74 act as a binary decimal converter and plate selector. All numeral plates except for the "9" plate 64 have been omitted from FIG. 5 for purposes of clarity. The remaining numeral plates 55–63 are indicated by the corresponding primed numbers 55'–63' associated with the fragmentary portions of the numeral plates shown in FIG. 5. A series of springs 75–84 is connected at one extremity to a wall 85 of the device, and each of the springs 75–84 is connected under compression to a numeral plate at its other extremity. Therefore, each numeral plate tends to be forced away from the wall 85. For example, the "9" plate 64 is connected to the wall 85 by a spring 84 under compression. The "9" plate 64 is therefore forced away from the wall 85, but is retained in its position by a cam 86 associated with the cam shaft 72, a cam 87 associated with the cam shaft 73, and a cam 88 associated with the cam shaft 74. However, the spring 82 is in its extended position, indicating that the numeral plate 62', the "7" plate, is out of alignment with the remaining plates 55'–61', 63' and 64. The shifting of the numeral plate 62' is possible because a cam 90 associated with the cam shaft 71, a cam 91 associated with the cam shaft 72, a cam 92 associated with the cam shaft 73, and a cam 93 associated with the cam shaft 74, are all in their vertical positions. The "3" plate is retained in its aligned position, since, although its cam 94 associated with the shaft 71 is in its vertical position, as are its cams 95 and 96 associated respectively with the shafts 72, and 74, its cam 97, associated with shaft 73, is in a horizontal position and retains the "3" plate in its position of alignment with the other numeral plates. Thus it may be seen that the cam positions correspond to a binary decimal conversion code, in which a "0" corresponds to a vertical position and a "1" corresponds to a horizontal position, each shaft being rotatable through a ninety degree arc, and the shafts 71, 72, 73 and 74 corresponding to the "1," "2," "4" and "8" digits respectively.

| Decimal number | Binary number | | | |
|---|---|---|---|---|
| | Shaft 74 | Shaft 73 | Shaft 72 | Shaft 71 |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |

It is therefore apparent that the cam shafts 71, 72 and 73, as shown in FIG. 5, have been rotated 90° clockwise from their "zero" input positions while the cam shaft 74 remains in its "zero" input position. The selective activation of the cam shafts may be illustrated by a description of the operation of the cam shaft 74, corresponding to the fourth binary digit place or the "8" decimal digit. When the binary digit "1" in the fourth binary place is applied to the system, a relay (not shown) is energized, applying an energizing potential to a pair of input leads 100 connected between the connector 20 (FIG. 1) and a solenoid 101 (FIG. 5). Energization of the solenoid 101 causes a solenoid arm 102 to retract. A crank 103 connects the solenoid arm 102 to the cam shaft 74. Retraction of the solenoid arm 102 causes the crank 103 to rotate the cam shaft 74 in a clockwise direction. The solenoid arm is connected to a container wall 104 by means of a spring 105 which is under tension. Thus when the solenoid 101 is not energized, the spring 105 will cause the solenoid arm 102 to assume its de-energized position (the position shown in FIG. 5). When it is desired to change the display of the luminous display device, the energizing relay (not shown), which was mentioned previously, is de-energized, and the energizing potential is thereby removed from the solenoid 101, whereupon the cam shaft 74 is returned to its rest position through the action of the spring 105.

Referring now to FIG. 6, there is shown a partial schematic diagram of the luminous display device 12. In addition to the components previously described, there is shown a first binary digit ("1") solenoid 110 having a solenoid arm 111, a second binary digit ("2") solenoid 112 having a solenoid arm 113, and a third binary digit ("4") solenoid 114 having a solenoid arm 115. All of these solenoids 101, 110, 112, 114 have a common return lead 116; and the first binary digit solenoid 110 has an energizing lead 117, the second binary digit solenoid 112 has an energizing lead 118, the third binary digit solenoid 114 has an energizing lead 119, and the fourth binary digit solenoid 101 has an energizing lead 120. These leads 116, 117, 118, 119, 120 are terminated at a set of connector terminals 131. The first, second and third binary digit solenoid arms 111, 113 and 115 are connected to the container wall 104 by springs 122, 123 and 124 respectively. First, second, third, fourth and fifth guide members 125–129 maintain the alignment of the cam shafts. The lateral alignment of the numeral plates 55–64 may be maintained by any conventional means. For example, each plate may be equipped with runners which ride in grooves located on the upper and lower surfaces of the container for the device 12. The coding plate 54 is attached to the container walls 104, 85 by members 130, 131 respectively. The display screen 15 is attached to the container walls 104, 85 by members 132, 133 respectively.

The device hereinbefore described utilizes binary-decimal conversion and cam shafts to displace the desired plate. However, alternately, a separate relay may be utilized to displace each plate, or plates may be displaced manually. Additionally, various special relays may be used to furnish a "memory" function. It should be understood that the four bit binary code illustrated is utilized for explanatory purposes only. Conventional six bit binary codes may be utilized to produce an alphanumeric display, the only limitation being that for each additional bit added to the binary code, an additional cam shaft and drive means must be added to the system described. Also, the motion of the cam shafts need not be in a reciprocating manner. Cam shafts may be driven in a unidirectional rotary manner by any conventional means, a gear system for example, and a plurality of codes may be placed on a single shaft so that 360° rotation is not necessary to reset the shaft to its "zero" position.

The display system described utilizes a coding plate to insure that no spurious transparent areas occur. However, in a practical system in which many indicia plates are used, the statistical probability of having a spurious transparent area without the coding plate is very low. Therefore, in certain applications, the use of a coding plate in the display device is not necessary. Alternatively, the physical structure of the device may make it advisable to use a number of coding plates intermixed with indicia plates. In addition, while the system described utilizes a display screen, any surface so situated as to allow the light passing through the resultant transparent area to fall thereon may be utilized, and it is therefore to be understood that the invention is not limited to the use of a display screen physically attached to the device. Direct viewing of the plates without the use of any display screen may also be utilized in certain applications. In such applications, the alignment of the viewer with the plates and light source eliminates the necessity for having a display surface.

Figure 7:
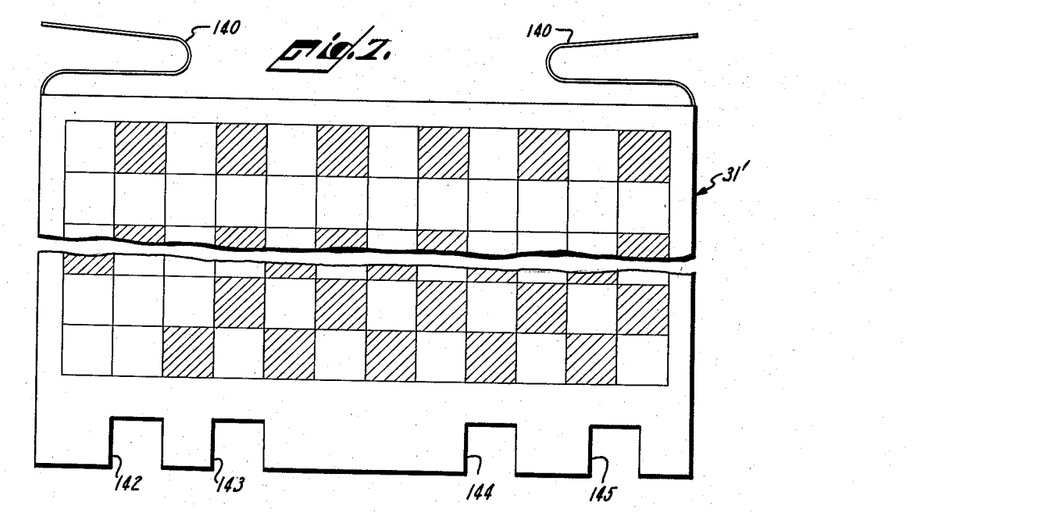
FIGURE 7 is a view of a 7 indicium plate constructed according to an alternate embodiment of the invention.

FIGURE 7 illustrates an alternate embodiment of an indicium plate. Such a plate may be readily formed by the photo-etching process hereinafter described. An indicium plate 31' contains the same pattern as the indicium plate 31 of FIG. 2(A). In addition, the indicium plate 31' has a pair of springs 140 formed on its upper surface. These springs are adapted to ride against the top surface of the luminous display device so as to urge the plate 31' downward. Four indentations 142, 143, 144, and 145 are formed preferably on the bottom peripheral surface of the plate 31'. These indentations are spaced so as to represent a binary code. For example, the space between the indentation 142 and the indentation 143 is greater than the space between the indentation 144 and the indentation 145. A broad space is provided between the indentation 143 and the indentation 144, the reason for which will be described with respect to FIG. 8.

Figure 8:
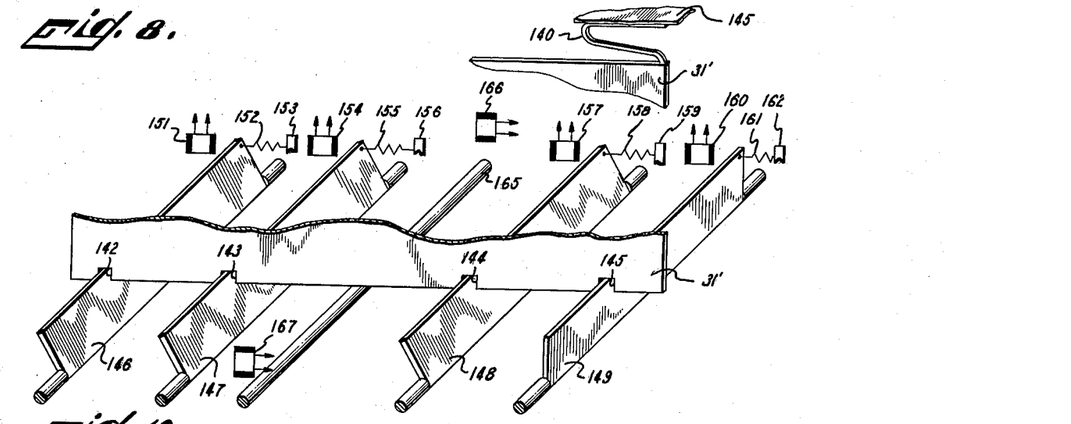
FIGURE 8 is a perspective view of the plate aligning and displacing device utilized with plates of the type illustrated in FIG. 7.

FIGURE 8 illustrates a device which may be used to control the alignment and displacement of indicia plates such as shown in FIG. 7 from a preselected alignment. The plates are housed as previously described, except that the cam and spring surfaces utilized to provide the lateral displacement illustrated in FIG. 5 are replaced by slides or grooves in the side walls of the device which limit lateral displacement of the plates but allow vertical displacement.

The luminous display device (FIG. 8) has an upper housing surface 145 against which the springs 140 rest. The indentations on the lower surface of the indicium plate 31' are illustrated in FIG. 8 as engaging four rotatable bars 146, 147, 148 and 149 which run longitudinally through the display device. Each of the rotatable bars 146, 147, 148 and 149 has associated therewith a relay and a restraining spring. When the relay is energized, the rotatable bar is rotated counterclockwise. When the relay is de-energized, the rotatable bar is rotated clockwise by means of the spring to a vertical position. Stops (not shown) are used to limit the amount of rotation of the rotatable bars.

The first rotatable bar 146 has associated therewith a relay 151 and a restraining spring 152 which is connected to an anchor post 153. The second rotatable bar 147 has associated therewith a relay 154 and a restraining spring 155 which is connected to an anchor post 156. The third rotatable bar 148 has associated therewith a relay 157 and a restraining spring 158 which is connected to an anchor post 159. The fourth rotatable bar 149 has associated therewith a relay 160 and a restraining spring 161 which is connected to an anchor post 162.

It should be noted that in FIG. 8 the first three rotatable bars 146, 147, 148 have been rotated counterclockwise, indicating that the relays 151, 154 and 157 associated therewith have been energized. However, the fourth rotatable bar 149 remains in its vertical position, indicating that relay 160 has not been energized.

Analogous to the previous description with respect to FIG. 5, the rotatable bar 146 is considered to represent the "1" binary digit; the rotatable bar 147, the "2" binary digit; the rotatable bar 148, the "4" binary digit; and the rotatable bar 149, the "8" binary digit. Furthermore, it is assumed that the vertical position of a rotatable bar represents a binary "0" and the counterclockwise rotation of the rotatable bar represents a binary "1." The binary word indicated by the rotatable bars in FIG. 7 is then 0111. Referring to the binary decimal conversion code chart previously given, it is seen that the decimal number represented by the shafts as illustrated in FIG. 8 is the number 7.

By positioning the rotatable bars 146–149 as shown in FIG. 8, the rotatable bars engage the indentations 142–145 of the indicium plate 131', thereby allowing the indicium plate 31' to drop out of the preselected alignment under the urging of the springs 140. However, all the remaining indicium plates in the device remain in the preselected alignment, since the rotatable bars 146–149 do not engage all of the binary coded indentations of any of the remaining plates. Therefore, the display device displays the number 7, by the process previously described with respect to FIGS. 2–6.

A plate re-alignment bar 165 is operated by a pair of relays 166—167 when it is desired to return the plates to the preselected alignment. Energization of these re-alignment relays 166, 167 lifts the re-alignment bar 165 vertically, causing the indentations 142–145 to be lifted clear of the rotatable bars 146–149. The rotatable bars are then returned to their normally vertical position by de-energizing the energized relays associated therewith. The luminous device is thereupon ready for the display of another indicium by rotating the appropriate rotatable bars, so as to cause the displacement of another indicium plate from the preselected alignment.

An increase in the speed of operation is achieved by energizing the relays in accordance with the next indicium to be displayed by the device prior to energizing the re-alignment relays 166, 167. When the rotatable bar relays 151, 154, 157 and 160 are energized, the indentations of the displaced plate engage the rotatable bars 146–149 so as to prevent their movement in an amount sufficient to allow the displacement of another plate. The re-alignment relays 166, 167 are then energized causing the re-alignment bar 165 to lift the displaced plate clear of the rotatable bars 146–149. The rotatable bars 146–149 then rotate in accordance with the energization of the relays 151, 154, 157, 160. The re-alignment bar is then dropped by de-energizing the re-alignment relays 166, 167. Thereupon, the indentations of an indicium plate engage each of the rotatable bars 146–149, and that plate is displaced by the action of its springs 140, as previously described.

Figure 9:
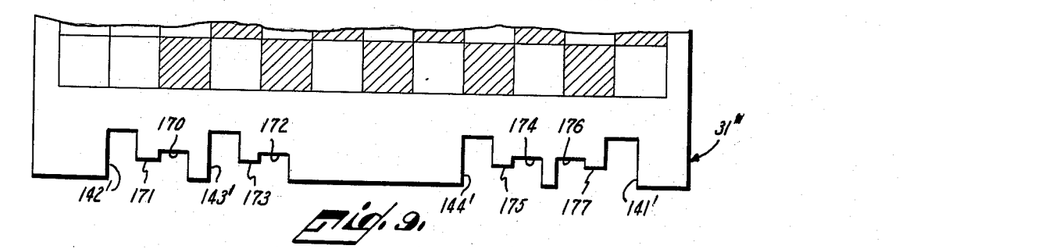
FIGURE 9 is a view of another alternate embodiment of a 7 indicium plate.

FIGURE 9 illustrates an alternate embodiment of the invention. An indicium plate 31" is identical to the plate 31' except for the interior shape of its indentations. In the indicium plate 31", each of the binary coded substantially rectangular indentations consist of a major indentation and a minor indentation. The major indentation corresponds to a portion of the single indentation of the indicium plate 31' (FIG. 7), and the minor indentation corresponds to the peripheral surface adjacent the indentations of the indicium plate 31'.

The indicium plate 31" has a "1" major indentation 142' and a "1" minor indentation 170 separated by a step 171 whose function will be described with respect to FIG. 10. The step is preferable but not essential for the operation of the display device utilizing indicium plates constructed as is illustrated in FIG. 9. The "2" digit has a major indentation 143' and a minor indentation 172 separated by a step 173. The "4" binary digit has a major indentation 144' and a minor indentation 174 separated by a step 175. The "8" digit has a major indentation 145' and a minor indentation 176 separated by a step 177.

It should be noted that the "1," "2," and "4" indentations all have the major indentation to the left of the minor indentation as viewed in FIG. 9, whereas the "8" indentation has the major indentation to the right of the minor indentation. Utilizing a binary code in which a major indentation to the right of the related minor indentation indicates a binary "0" and a major indentation to the left of the related minor indentation indicates a binary "1," it is seen that the indicium plate 31" has a binary code of "0111" on its lower peripheral surface. Referring back to the binary decimal conversion code, the indicium plate 31 therefore contains the decimal number 7.

It should also be noted that one edge of the major indentation of the plate 31" corresponds in alignment to an edge of the corresponding digit indentation in the indicium plate 31' illustrated in FIG. 7. Therefore, it is apparent that the binary coding of the indicium plates corresponds to the location of this edge of the indentation, and the remaining indentation configuration consists of an adaptation of the indentation according to the specific operating structure associated therewith.

Figure 10:
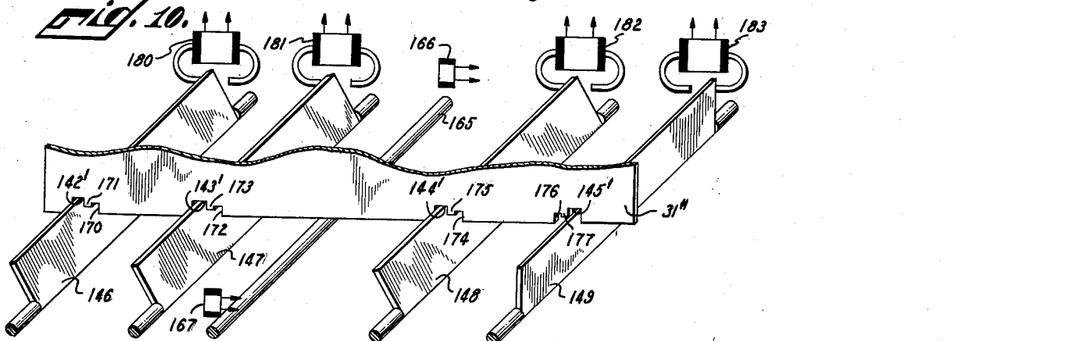
FIGURE 10 is a perspective view of the plate aligning and displacing device utilized with plates of the type illustrated in FIG. 9.

Referring now to FIG. 10, there is shown an aligning and displacing device utilizing indicia plates constructed as the indicia plate 31" of FIG. 9 is constructed. The device illustrated in FIG. 10 has rotatable bars 146—149, and plate re-alignment means consisting of a re-alignment bar 165 and re-alignment relays 166, 167. In FIG. 10, polarized relays are utilized to provide positive clockwise and counterclockwise rotation of the rotatable bars.

The rotatable bar 146 has a polarized relay 180 associated therewith which is operable to rotate the rotatable bar counterclockwise from the vertical position in response to a binary "1" relay input, and to rotate the bar clockwise to the vertical position in response to a binary "0" relay input. The rotatable bars 147, 148, 149 have polarized relays 181, 182, and 183 associated therewith, which relays function the same as does relay 180.

The operation of the device of FIG. 10 is similar to that described with respect to FIG. 8. Minor indentations 170, 172, 174, 176 together with the steps 171, 173, 175, 177 provide a means to lock the device, once operated, to prevent the re-alignment of the indicia plates unless the reset bar 165 lifts the indicia plates clear of the steps associated therewith. This locking provides a memory function in that the binary input can be determined by sensing the rotation of the rotatable bars after the device has been set to display an alphanumeric indicium.

Those plates, all of whose major indentations are not engaged by the rotatable bars 146–149, are retained in the preselected alignment by at least one of the minor indentations and the step associated therewith. Operation of the re-alignment bar 165 by the energization of the re-alignment relays 166, 167 lifts all of the plate steps clear of the rotatable bars. The plates are thereby returned to the preselected alignment. The device is then ready to display another indicium.

Figure 11:
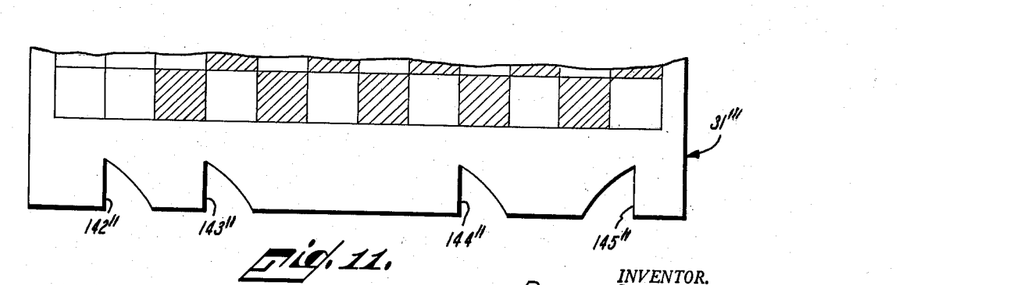
FIGURE 11 is a view of another alternate embodiment of a 7 indicium plate.

FIGURE 11 illustrates another embodiment of indicia plate coding. An indicium plate 31''' is identical to the indicium plate 31' (FIG. 7) except for the configuration of the four indentations. Each indentation consists of a substantially vertical side and an arcuate side. By referring to FIG. 11 with respect to FIGS. 7 and 9, it is seen that the substantially vertical side of each indentation is aligned with the side of a major indentation remote from the minor indentation in FIG. 9, and with one of the sides of an indentation in FIG. 7. By selecting a suitable arcuate surface material, such as Teflon, although addition of such material is not necessary, an easily slidable contact between the rotatable bar and the arcuate surface is provided.

The indicium plate 31''' has an indentation 142" corresponding to the "1" digit, indentation 143" corresponding to the "2" digit, indentation 144" corresponding to the "4" digit, and an indentation 145" corresponding to the "8" digit. The "1," "2," and "4" digit indentations have the arcuate side to the right of the vertical side as illustrated in FIG. 11. The "8" indentation 145" has the arcuate side to the left of the vertical side as illustrated in FIG. 11. Utilizing a code in which an arcuate side to the right of the vertical side indicates a binary "1" and an arcuate side to the left of the vertical side indicates a binary "0," and referring to the binary decimal conversion code previously given, it is seen that the plate 31''' contains the binary word 0111 and therefore the decimal number 7.

Figure 12:
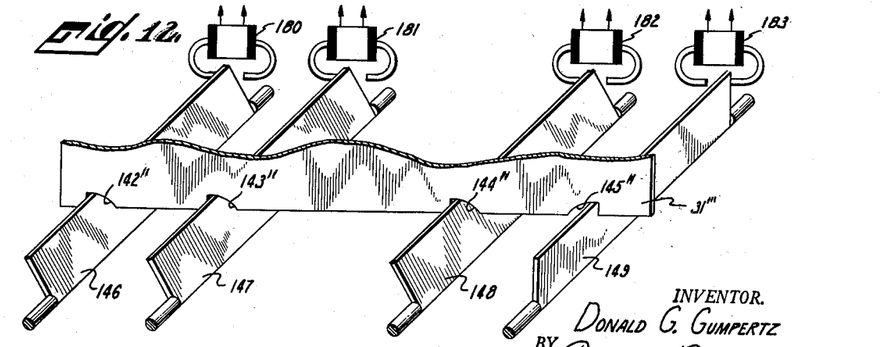
FIGURE 12 is a perspective view of the plate aligning and displacing device utilized with plates of the type illustrated in FIG. 11.

Referring now to FIG. 12, a device for utilizing indicia plates constructed as illustrated in FIG. 11 is shown. The device of FIG. 12 corresponds to the device of FIG. 10 with the exception of the re-alignment bar 165 and re-alignment relays 166, 167, which are eliminated.

When each of the rotatable bars 146–149 is in its vertical position, the indicia plate 31''' is retained in the preselected alignment. When the rotatable bars 146–148 are rotated counterclockwise by the action of the relays 180–182, the indicia plate 31''' drops out of the preselected alignment in response to the urging downward of the plate by the spring 140 against the upper surface 145 (not shown) of the luminous display device. The numeral 7 is thereupon displayed by the device in the manner previously described with respect to FIGS. 7–10.

When it is desired to reset the device illustrated in FIG. 12, binary pulses corresponding to the new indicium to be displayed are applied to the relays 180–183. Those relays which must change their state from a "0" to a "1" do so, causing the rotatable bars associated therewith to rotate counterclockwise. Those relays which must change their state from a "1" to a "0" do so, causing the rotatable bars associated therewith to rotate clockwise. The rotation of any bar engaging an indentation of a displaced plate causes the plate to be returned to the preselected alignment. When the bars are rotated to correspond to the new indicium to be displayed, the appropriate plate is displaced by the action of its springs 140 (not shown) against the upper surface 145 (not shown) of the display device.

In the binary decimal conversion code previously given, the energization of the relays 180–183 by a binary "0" will result in the display of the decimal number "0," since the code illustrates the decimal "0" as corresponding to the binary digit "0000." Supression of zeros may be easily accomplished by changing the binary word corresponding to a decimal "0." For example, the binary word corresponding to a decimal "0" may be selected to be "1010."

Figure 13:
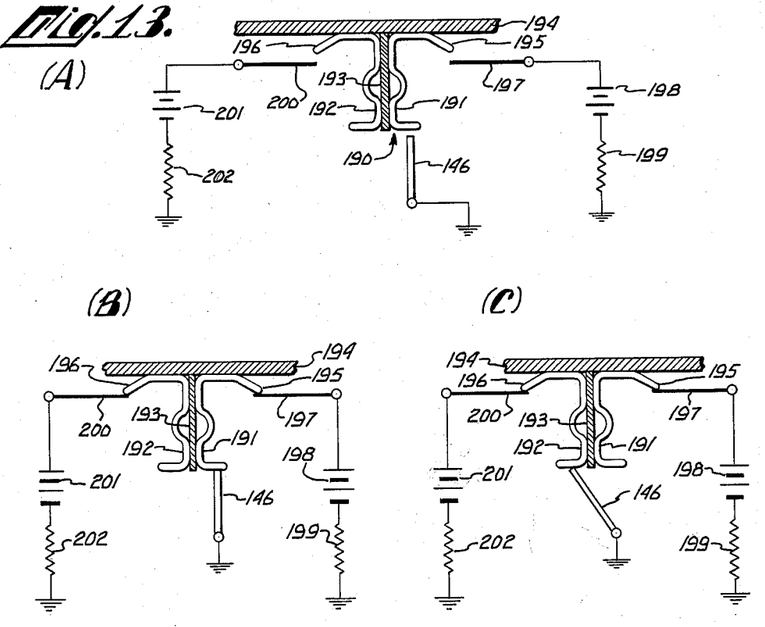
FIGURE 13 (parts (A)–(C) taken together) illustrates the operation of the binary check circuit pulse generator.

FIGURE 13 (parts A, B and C taken together) illustrates a system by which a binary check for the proper rotation of the rotatable bars 146–149 may be obtained. In FIG. 13 the rotatable bar 146 is indicated in a vertical position. A contact element indicated generally at 190 consists of an "0" contactor portion 191 and a "1" contactor portion 192 separated by an insulating board 193. The contact element 190 is connected to a support board 194 which is supported above the relay bars 146–149 until the binary check is to be made. The "0" contactor portion 191 has a wing tip contact 195 and the "1" contactor portion 192 has a wing tip contact 196. The "0" wing tip contact 195 is suspended above a feeler contact 197 connected in series with a battery 198, a load resistance 199, and ground or a common connection. The "1" wing tip contact 196 is suspended above a feeler contact 200 connected in series with a battery 201, a load resistance 202, and ground or a common connection.

In actuality, the contact support board 194 has four contact elements 190 connected thereto, one of the contact elements being supported above each of the rotatable bars 146–149. The portion of each of the rotatable bars 146–149 which contacts the contact element 190 is connected to ground or a common connection. After the rotatable bars 146–149 are set by the action of the relays associated therewith, the contact support bar 194 is lowered. The wing tip contacts 195, 196 thereupon make contact with the associated feeler contacts 197, 200.

The rotatable bar 146 is set in a vertical position, shown in FIG. 13(B), by the action of its associated relay. When the contact support board 194 is lowered, an electrical circuit is completed from the ground or common connection through the rotatable bar 146, the "0" wing tip contact 195, the "0" feeler contact 197, the "0" battery 198, and the "0" load resistance 199. Therefore, a voltage drop occurs across the "0" load resistance 199, indicating that the rotatable arm 146 is in the "0" position. The "0" load resistance 199 may, for example, be a differential relay coil in a circuit similar to that to be described with respect to FIG. 15. No voltage drop exists across the "1" load resistance 202 since no electrical circuit is completed through the "1" contactor 192, even though the "1" wing tip contact 196 is in contact with the "1" feeler contact 200.

In FIG. 13(C) the rotatable bar 146 has been rotated to the "1" position by the action of its associated relay. The contact support board 194 has been dropped and the rotatable arm 146 now makes contact with the "1" contactor 192. An electrical circuit is completed through the rotatable arm 146, the "1" contactor 192, the "1" wing tip contact 196, the "1" feeler contact 200, the "1" battery 201, and the "1" load resistance 202. A voltage drop therefore occurs across the "1" load resistance 202, indicating that the rotatable bar 146 is in the "1" position. The "1" load resistance 202 may, for example, be a differential relay coil such as is described with respect to FIG. 15.

Figure 14:
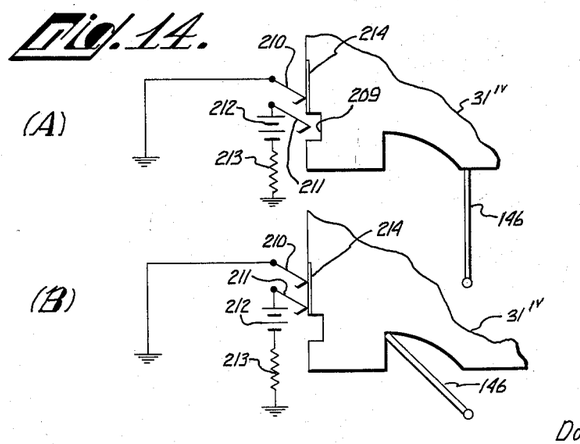
FIGURE 14 (parts (A) and (B)) illustrates the operation of the alphanumeric conversion pulse generator.

FIGURE 14 illustrates a method for obtaining an output in a unique electrical circuit in response to the displacement of a particular plate from the preselected alignment. The displacement of the particular plate indicates that the indicium associated therewith is being displayed. By completing a unique electrical circuit in response to the displacement of the plate, binary to alphanumeric conversion is accomplished. The electrical circuit may, for example, be the print circuit in a print-out device.

In FIG. 14(A) an indicium plate 31$^{IV}$ is indicated as being retained in the preselected alignment. The indicium plate 31$^{IV}$ differs from the indicium plates previously described in that the plate 31$^{IV}$ has a notch 209 formed in one of its vertically moving sides. A first feeler contact 210 rides against an electrical conducting surface on the side of the plate 31$^{IV}$ and is connected to ground or a common connection. A second feeler contact 211 rides in the notch 209 while the plate 31$^{IV}$ is retained in the preselected alignment. The second feeler contact 211 is connected in series with a battery 212, a load resistance 213, and ground or a common connection. So long as the plate 31$^{IV}$ is retained in the preselected alignment, as is illustrated in FIG. 14(A), no voltage drop across the load resistance 213 occurs.

In FIG. 14(B) the indicium plate 31$^{IV}$ has been displaced downward from the preselected alignment by the action of the springs 140 and the rotatable bars 146–149. The second feeler contactor 211 now contacts an electrical conducting surface 214 along the edge of the plate 31$^{IV}$. An electrical circuit is thereby completed from ground or a common connection through the first feeler contact 210, the conducting surface 214, the second feeler contact 211, the battery 212, the load resistance 213, and ground or the common connection. The voltage drop across the load resistance 213 indicates that the plate 31$^{IV}$ has been displaced. The load resistance 213 may, for example, be the coil for the print magnet of an electrical printout device.

FIGURE 15 illustrates a control system for setting up the display shown in FIG. 1. The number 387 is to be displayed by means of the display device 12, 13 and 14 (FIG. 1).

Three input switches 220, 221, 222 of a series of input switches have setting selectors 225, 226, 227 associated therewith. The input switches 220, 221, 222 are utilized to convert the decimal number desired to be set up into a binary coded signal. The code may, for example, be that previously described. The input switches are more fully described with respect to FIG. 16.

The binary coded signal is formed by completing an electrical circuit through the switch and appropriate "1", "2", "4" and "8" buses 230. An electrical circuit is completed from ground or a common connection through an electrical potential source 231, a stepping switch 232, the appropriate input selector switch 220-222, the appropriate binary bus 230, and through a differential relay to ground or the common connection.

In FIG. 15 four differential relays 233, 234, 235, 236 are shown corresponding to the "1", "2", "4" and "8" binary digits respectively. Each of the binary buses 230 is connected directly to the upper input of the differential relay 233-236 associated therewith. The lower input of the differential relays 233-236 is connected to the binary buses 230 through contacts 240, 241, 242, 243, respectively, of a normally de-energized check relay 245. Therefore, the completion of a circuit in a binary bus 230 will cause both sides of the differential relay associated therewith to be energized.

The differential relays 233-236 have normally open contacts 246, 247, 248, 249, respectively, associated therewith. The relay contacts 246-249 are parallel connected with respect to each other and are each connected in series with a stop and alarm circuit 250. Thus, the stop and alarm circuit is de-energized so long as all of the relay contacts 246-249 are open. However, when any one of the relay contacts 246-249 is closed by the action of the differential relay associated therewith, the stop and alarm circuit 250 will be energized. When a binary bus 230 is energized to complete an electrical circuit therethrough, the electrical circuit is completed through both sides of the differential relays 233-236 associated therewith. Therefore, the relay contacts 246-249 remain in the open position.

Each of the differential relays 233-236 has a display device input stepping switch 253, 254, 255, 256 associated therewith. The completion of the circuit through the contacts 240-243 of the check relay 245 completes an electrical circuit through the respective display device input stepping switch 253-256 to one of the display devices 12-14. Each of the display device input stepping switches 253-256 has contacts A, B, C, D, E, and F. The A and B contacts are connected to the luminous display device 12, the C and D contacts, to the luminous display device 13, and the E and F contacts, to the luminous display device 14.

A stepping switch 257 serves to complete an electrical circuit between the electrical potential source 231 and the check relay 245, so as to energize the check relay.

A stepping switch 258 applies reset pulses generated by a reset pulse generator 259 to the luminous display devices 12, 13, 14.

The stepping switches 232, 253, 254, 255, 256, 257 and 258 are ganged together and are driven by a stepping motor 260. A reset button 261 serves to actuate the stepping motor 260 to set the stepping switches 232, 253, 254, 255, 256, 257, 258 to the positions shown in FIG. 15. The motor 260 then steps the switches progressively through the contact positions.

Assume that the decimal number 3 is to be displayed on a luminous display device 12 and that the luminous display device 12 includes an actuating system such as is illustrated with respect to FIG. 8. The decimal selector 225 is set to the number 3. The reset button 261 is operated, causing the stepping motor 260 to place the stepping switches 232, 253, 254, 255, 256, 257, 258 in the positions shown in FIG. 15.

When the stepping switch 232 is in the position shown in FIG. 15, the input switch 220 completes electrical circuits through the "1" and "2" binary buses, corresponding to the binary word 0011. Energization of the "1" and "2" binary buses completes circuits through the A contacts of stepping switches 253 and 254, thereby energizing the corresponding relays 151, 154 (FIG. 8) in the luminous display device 12. As electrical circuits are not completed through the "4" and "8" binary buses, the relays 157, 160 are de-energized.

The reset pulse generator 259 generates a reset pulse which is transmitted by the stepping switch 258 to the luminous display device 12. The relays 166, 167 (FIG. 8) are energized thereby to momentarily actuate the re-alignment bar 165. When the re-alignment bar 165 is released, the desired plate is displaced through the action of the springs 140 and the rotatable bars 146-149.

In order to check for the proper position of the rotatable bars 146-149, a binary check circuit is included. The binary check is made by comparing the states of energization of the binary buses 230 with the rotation position of the rotatable bars 146-149. As was described with respect to FIG. 13, an electrical circuit is completed to indicate whether the rotatable bar is in the "0" position or is in the "1" position. In the circuit to be described hereinafter, it will be assumed that the completion of an electrical circuit indicates that the bar is in the "1" position and that the absence of a completed electrical circuit indicates that the bar is in the "0" position. Similarly, the binary buses 230 are only energized when a binary "1" is to be applied to the luminous device.

To initiate the binary check, the stepping switches 232, 253-258 are rotated clockwise one position from that shown in FIG. 15. The check relay 245 is thereby energized by means of the circuit completed through the stepping switch 257. The contacts 240-243 thereupon open.

Electrical circuits remain completed between the upper portions of relays 233, 234 and the "1" and "2" binary buses associated therewith. The opening of the contacts 240-243 removes the circuit continuity between the lower sections of the differential relays 233-236 and the binary buses 230. Stepping relays 253-256 have advanced to their B positions. In its B position, a stepping relay connects the "1" position output check circuits illustrated in FIG. 13 to their differential relays. The "1" load resistance illustrated in FIG. 13 as resistor 202 is comprised of the lower portion of the appropriate differential relay. Therefore, a completed electrical circuit exists through the lower portions of the "1" and "2" differential relays 233 and 234. The relay contacts 246 and 247 remain open. As no circuit is completed between either the upper or lower portions of the "4" and "8" differential relays 235 and 236, contacts 248 and 249 remain open.

Should one of the rotatable bars 146-149 be in the incorrect position for the proper display of the alphanumeric equivalent of the binary input signal, an unbalance will occur in one of the differential relays, thereby closing the differential relay contact associated therewith. Closure of a differential relay contact will energize the stop and alarm circuit 250. The stop and alarm circuit 250 stops the operation of the stepping motor 260 and gives a visual or audible indication of the alarm circuit energization. Such an unbalance in a differential relay during checking occurs either when the binary bus associated with the relay is energized and the "1" check circuit of FIG. 13 associated therewith is not energized, or when the binary bus is not energized and the "1" check circuit associated therewith is energized. Thus, a binary input output check is accomplished.

The luminous devices 13 and 14 are set by the operation of the switches 221, 222 in the same manner as described for the operation of the luminous display device 12.

Figure 16:
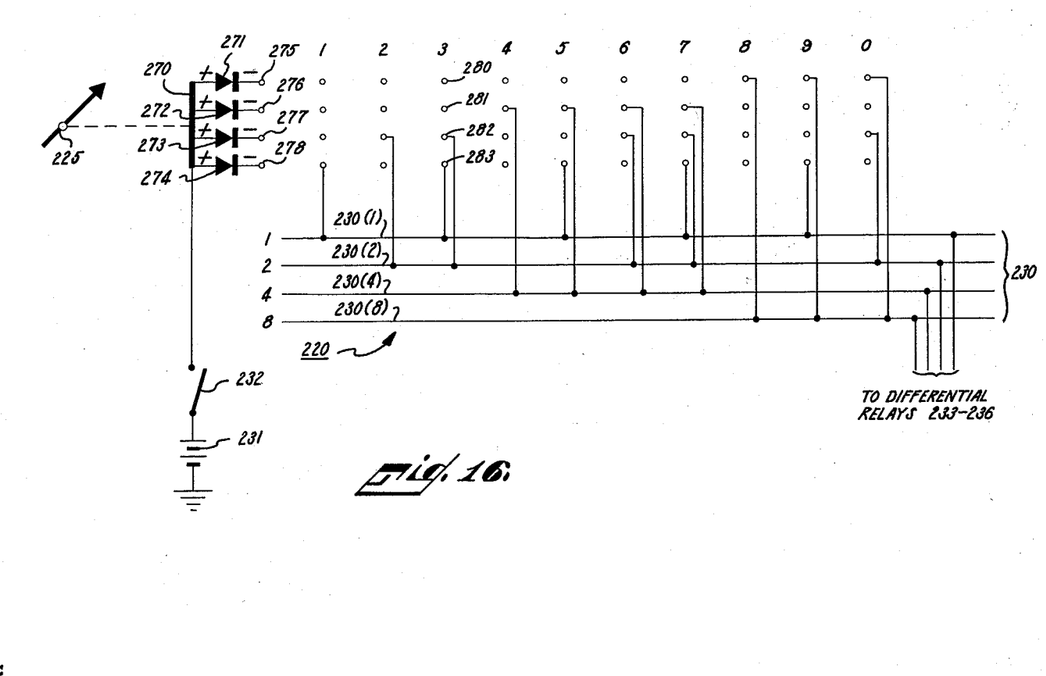
FIGURE 16 is a wiring diagram of an indicium setting switch of FIG. 15.

FIGURE 16 illustrates the circuit connections for one of the setting switches as shown in FIG. 15. The setting switch 220 consists of four banks of contacts, in which each bank has ten contacts. The connections shown in FIG. 16 are made to set up the binary conversion code previously described, with the exception that zero suppression is accomplished by the use of the binary word 1010 to indicate the decimal "0." The switch 220 has a contactor arm 270 which is ganged to the setting selector 225. Isolating diodes 271, 272, 273 and 274 are connected between the contactor arm 220 and contacts 275, 276, 277 and 278, respectively.

When the contactor arm 270 is rotated to its "3" position by rotating the setting selector 225, the contacts 275–278 are brought in contact with the "3" contacts 280, 281, 282, 283, respectively, of the switch 220. When the switch 232 closes in response to the stepping motor 260, an electrical circuit is completed through the switch 232, the contactor arm 270, the isolating diode 273, and the contacts 277 and 282 to the "2" binary bus 230(2). The completion of this electrical circuit energizes the differential relay 234 (FIG. 15) as previously described. An electrical circuit is also completed through the switch 232, the contactor arm 270, the isolating diode 274 and contacts 278 and 283 to the "1" binary bus 230(1). Completion of this circuit energizes the differential relay 233 (FIG. 15) as previously described. The "4" and "8" binary buses 230(4) and 230(8) are not energized, since no electrical circuits are completed through contacts 280 and 281 to these buses. Therefore, the binary number 0011 is indicated by the binary bus energization states.

Luminous display devices containing the described binary check circuitry are also utilizable as an information storage. By operating the binary check system and utilizing either one or both of the "0" and "1" load resistances 199, 202 as the storage input impedances, the binary word whose alphanumeric equivalent is being displayed can be obtained. Thus, the display can be read back into a permanent storage prior to resetting the devices with a new display.

The indicia plates may be readily formed by a photo etching process. In this process a large master of each indicium plate is fabricated. The master plate is then photographed. The negative of the master photograph is considerably reduced in size over the master. This negative is utilized as the pattern for forming the actual plates used. By fabricating a master plate of considerably greater size than the plates actually to be used, extremely close tolerances can be achieved, due to the reduction in size accompanying the photographic process. Both the light transmissive pattern and the binary coded indentations are readily produced by this process. Similarly, the springs 140 are formed during the photo etching process. The indicium plates produced by this process are metallic, thereby serving to produce plates of extreme durability and precision. It is thus economically practical to produce the plates described hereinbefore.

I claim:

1. An alphanumeric display device comprising a translucent display screen, a plurality of movable plates, a fixed plate, the movable plates and fixed plate having corresponding uniform patterns of transparent and opaque areas, a source of light, the plates being positioned in parallel relation to each other between the source of light and the display screen with the opaque areas of the plates in alignment with each other and the transparent areas in alignment with each other, whereby light from the source projects the pattern of transparent area on to the screen, each plate having a modified pattern such that when a plate is shifted relative to the fixed plate by a predetermined amount, the light pattern on the screen is modified to correspond to some identifiable alphanumeric character, a source of binary coded information signals, binary decoding means connected to said source and operable upon receipt of a binary coded signal to shift one of said movable plates, whereby a selected alphanumeric character image is produced on the screen corresponding to the binary coded information, switch means actuated by the decoding means for generating a checking signal, and means for comparing the checking signal with the binary coded information signal from said source to indicate the displacement of the correct plate.

2. Apparatus as defined in claim 1 wherein the pattern on the fixed plate and the movable plates is a checker board pattern of alternate transparent and opaque squares of equal size, the movable plate having selected squares reversed from the normal pattern such that a group of normally opaque squares are made transparent, the positioning of reversed squares corresponding to the general shape of an alphanumeric character.

3. An alphanumeric display device comprising a translucent display screen, a plurality of movable plates, a fixed plate, the movable plates and fixed plate having corresponding uniform patterns of equal transparent and opaque areas, a source of light, the plates being positioned in parallel relation to each other between the source of light and the display screen with the opaque areas of the plates in alignment with each other and the transparent areas in alignment with each other, whereby light from the source projects the pattern of transparent areas on to the screen, each plate having a modified pattern such that when a plate is shifted relative to the fixed plate by an amount equal to the width of an opaque area, the light pattern on the screen is modified to correspond to some identifiable alphanumeric character, a source of binary coded information signals, and binary decoding means connected to said source and operable upon receipt of a binary coded signal to shift one of said movable plates, whereby a selected alphanumeric character image is produced on the screen corresponding to the binary coded information.

4. An alphanumeric display device comprising a translucent display screen, a plurality of movable plates, a fixed plate, the movable plates and fixed plate having corresponding uniform patterns of transparent and opaque areas, a source of light, the plates being positioned in parallel relation to each other between the source of light and the display screen with the opaque areas of the plates in alignment with each other and the transparent areas in alignment with each other, each plate having a modified pattern such that when a plate is shifted relative to the fixed plate by a predetermined amount, the light pattern on the screen is modified to correspond to some identifiable alphanumeric character, and means for selectively shifting one of said movable plates, whereby a selected alphanumeric character image is produced on the screen.

5. Apparatus as defined in claim 4 wherein said decoding means includes a plurality of movable elements arranged to engage the movable plates and means for positioning the elements in one of two positions in response to said binary information signals from said source, the number of elements engaging any one plate being equal to the number of binary bits in the information signal, the elements being arranged to displace a different one of the plates in response to each particular positional pattern of the elements.

6. Apparatus as defined in claim 5 wherein the movable plates have coded notches along one edge, the elements being arranged to move into and out of alignment with the notches depending upon the position of the elements in relation to the notches in each plate.

7. Apparatus as defined in claim 6 wherein the notches form camming surfaces engageable with said elements, the elements in a notch, when moved to its opposite position, engaging the camming surface and moving the associate plate by the action of the elements moving against the camming surface.

8. A digital display device comprising a plurality of movable plates, at least one fixed plate, the fixed plate having a checker board pattern of transparent and opaque spots and each of the movable plates having a checker board pattern of transparent and opaque spots but with selected spots being reversed in light transmission properties from the normal checker board pattern, each movable plate having a unique pattern formed by the selected reversed spots, the movable plates and fixed plate being positioned in closely spaced parallel relationship, a light source for directing light through all the plates through aligned transparent spots, a translucent display screen, and means for selectively shifting any one of the movable plates in a direction parallel to the other plates by a distance substantially equal to an integral multiple of the width of one spot.

References Cited in the file of this patent
UNITED STATES PATENTS

| | | |
|---|---|---|
| 1,796,030 | Kell | Mar. 10, 1931 |
| 2,323,824 | Maschmeyer | July 6, 1943 |
| 2,426,079 | Bless | Aug. 19, 1947 |
| 2,448,830 | Robbins | Sept. 7, 1948 |
| 2,558,577 | Myers | June 26, 1951 |
| 2,605,965 | Shepherd | Aug. 5, 1952 |
| 2,642,685 | Handley | June 23, 1953 |
| 2,909,768 | Kantz | Oct. 20, 1959 |